United States Patent
Grewe

(10) Patent No.: US 10,650,682 B2
(45) Date of Patent: May 12, 2020

(54) COMMUNICATION SYSTEM FOR A VEHICLE AND METHOD FOR COMMUNICATING

(71) Applicant: Continental Automotive GmbH, Hannover (DE)

(72) Inventor: Ralph Grewe, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/518,715

(22) PCT Filed: Oct. 12, 2015

(86) PCT No.: PCT/EP2015/073592
§ 371 (c)(1),
(2) Date: Apr. 12, 2017

(87) PCT Pub. No.: WO2016/059006
PCT Pub. Date: Apr. 21, 2016

(65) Prior Publication Data
US 2017/0236419 A1 Aug. 17, 2017

(30) Foreign Application Priority Data
Oct. 13, 2014 (DE) .......................... 10 2014 220 687

(51) Int. Cl.
*G08G 1/16* (2006.01)
*G08G 1/01* (2006.01)
(Continued)

(52) U.S. Cl.
CPC ............ *G08G 1/161* (2013.01); *G08G 1/0112* (2013.01); *G08G 1/163* (2013.01); *G08G 1/164* (2013.01);
(Continued)

(58) Field of Classification Search
CPC ....... B60W 30/00; G01C 21/26; G01C 21/28; G01C 21/30; G01C 21/32; G08G 1/161;
(Continued)

(56) References Cited

U.S. PATENT DOCUMENTS

| 4,375,013 A * | 2/1983 | Cointot ................. H03M 3/042 341/143 |
| 6,047,234 A * | 4/2000 | Cherveny .............. G01C 21/26 340/988 |

(Continued)

FOREIGN PATENT DOCUMENTS

| CN | 1617186 A | 5/2005 |
| CN | 101297299 A | 10/2008 |

(Continued)

OTHER PUBLICATIONS

International Search Report and Written Opinion dated Feb. 12, 2016 from corresponding International Patent Application No. PCT/EP2015/073592.

(Continued)

*Primary Examiner* — Franklin D Balseca

(57) ABSTRACT

The invention relates to a communication system for a vehicle, which device includes a sensor device, wherein the sensor device is arranged to capture sensor data when the sensor device moves. A receiving device receives reference data from an external management system and a processing device determines a difference between the captured sensor data and the corresponding reference data, wherein the determined difference between the captured sensor and the corresponding reference data is transmitted to the external management system.

14 Claims, 4 Drawing Sheets

(51) Int. Cl.
*H04Q 9/00* (2006.01)
*H04L 12/40* (2006.01)

(52) U.S. Cl.
CPC ............... *H04Q 9/00* (2013.01); *H04L 12/40* (2013.01); *H04L 2012/40215* (2013.01); *H04L 2012/40273* (2013.01); *H04Q 2209/00* (2013.01); *H04Q 2209/10* (2013.01); *H04Q 2209/40* (2013.01)

(58) Field of Classification Search
CPC ...... G08G 1/0112; G08G 1/163; G08G 1/164; H04Q 9/00; H04Q 2209/00; H04Q 2209/10; H04Q 2209/20; H04Q 2209/40; H04Q 2209/50; H04L 12/40; H04L 2012/40215; H04L 2012/40273
See application file for complete search history.

(56) References Cited

U.S. PATENT DOCUMENTS

| | | | |
|---|---|---|---|
| 7,167,799 B1 | 1/2007 | Dolgov et al. | |
| 7,464,027 B2* | 12/2008 | Schuller | G10L 19/032 704/200.1 |
| 8,533,166 B1* | 9/2013 | Sulieman | H04L 69/04 707/693 |
| 8,718,861 B1* | 5/2014 | Montemerlo | B60W 30/00 701/26 |
| 9,860,894 B2* | 1/2018 | Liu | H04W 72/0446 |
| 2005/0102096 A1 | 5/2005 | Min et al. | |
| 2007/0100537 A1 | 5/2007 | Parikh et al. | |
| 2008/0275633 A1 | 11/2008 | Cummings | |
| 2010/0100325 A1 | 4/2010 | Lovell et al. | |
| 2012/0010762 A1 | 1/2012 | Asano | |
| 2013/0143494 A1* | 6/2013 | Chen | H04W 8/22 455/41.2 |
| 2013/0218398 A1* | 8/2013 | Gandhi | B60R 16/02 701/31.1 |
| 2013/0275044 A1 | 10/2013 | An et al. | |
| 2014/0104077 A1* | 4/2014 | Engel | G08G 1/0962 340/901 |
| 2014/0278047 A1 | 9/2014 | Bahl et al. | |

FOREIGN PATENT DOCUMENTS

| | | |
|---|---|---|
| CN | 102362301 A | 2/2012 |
| EP | 0921509 A2 | 6/1999 |
| JP | 2006270544 A | 10/2006 |
| JP | 2013097530 A | 5/2013 |
| WO | 2013060323 A1 | 5/2013 |

OTHER PUBLICATIONS

English Translation of DE 102009006113 A1.
English Translation of DE 19842912 A1.

* cited by examiner

COMMUNICATION SYSTEM FOR A VEHICLE AND METHOD FOR COMMUNICATING

BACKGROUND

It is assumed that a highly accurate map, a topographic map or highly accurate geo-data will be used in future driver assistance systems and during highly automated driving. So that this map is always up-to-date, the vehicles have a permanent connection to a so-called "backend" which stores the map and associated map data. Communication takes place between the vehicle and the backend.

A grid-based environmental model for a vehicle is known from the document WO 2013/060323 A1.

Methods for compressing data are also known.

A high data rate can be expected when transmitting data between the vehicles and a backend since the data are provided, in particular, by a multiplicity of vehicles. Compression methods can be used during transmission in order to reduce the data rate.

It may be desirable to make the transmission of vehicle environmental model data, for example to a backend, more efficient.

BRIEF SUMMARY

Accordingly, one aspect of the invention may provide a communication apparatus, a vehicle having a communication apparatus, a management apparatus, a communication method, a program element and a computer-readable storage medium.

The subject matter of the invention is specified by the features of the independent patent claims. Further embodiments are specified by the features of the dependent patent claims and by the following description.

In order to keep the map data or reference data up-to-date in the backend, it is possible to use the environmental data determined by vehicles as data sources. For this purpose, the acquired environmental data must be transmitted to the backend.

The environmental data are determined by a sensor device and/or a multiplicity of sensor devices in a vehicle in order to operate driver assistance systems, for example.

One aspect of the invention describes a communication apparatus for a vehicle. The communication apparatus has a sensor device, a receiving device, a processing device, and a transmission device. These devices are connected to one another, for example using a bus system inside the vehicle. The sensor device is set up to acquire sensor data. In particular, the sensor device is set up to acquire the sensor data during a movement of the sensor device. In order to acquire the sensor data, the sensor data may be cyclically queried, for example, with the result that an environmental model can be cyclically formed from the sensor data. Different sensor devices may have different cycle times. The acquisition of the sensor data at periodic times can be interpreted as an operation of scanning the environment. In this case, different sensor devices may collect different environmental data which are combined in an environmental model. The environmental model may be subject to temporal and/or local changes. The environmental model of a communication apparatus and/or of a vehicle may represent an excerpt from the reference data and/or map data managed by the management apparatus. The environmental model may be a database. In other words, an environmental model may be managed in a database. This database may be managed inside the vehicle and may have the acquired sensor data from the sensor device(s) with an indication of the time and/or location.

The sensor data may be stored as objects in the environmental model. The objects may be identified items, for example a road marking, a traffic sign or roadworks. However, the objects may also be only probability values for an existing item. The environmental model may be at least partially organized as a grid-based environmental model, that is to say an occupancy grid.

The environmental model may consequently have an object list such as traffic signs, vehicle markings, crash barriers or other vehicles and/or an occupancy grid, for example a grid around the vehicle with areas which can be driven on.

The receiving device is set up to receive reference data from an external management apparatus, for example map data from a backend and/or from a roadside unit. The management apparatus is arranged outside the sensor device. The reference data received by the vehicle are stored in the vehicle and are used there to accurately locate the vehicle on the map and for merging with data relating to the environmental model. In order to update the reference data in the management apparatus, for example the backend, the environmental model data are also transmitted to the backend before merging. Environmental model data and reference data may be organized as arrays, graphs or lists. Such structures make it possible to concatenate or combine physical memory cells of a database according to the environmental model data and/or the reference data, thus making it possible to form the difference between the environmental model data and the reference data by comparing corresponding contents of the memory cells.

The processing device of the communication apparatus is set up to determine a difference between the acquired sensor data, that is to say substantially the environmental model data, and the corresponding reference data. In one example, the environmental model which is cyclically updated with the sensor data may be compared with the reference data. In order to be able to form the difference, the reference data may be organized in a grid-based manner corresponding to the environmental model. This makes it possible to compare sensor data at one grid location with the reference data at a corresponding grid location. The grid can be considered to be a reference coordinate system, with the result that particular locations of the environmental model can be compared with the corresponding locations of the reference data. The grid can be oriented to geographical coordinates.

In this context, the term "difference" may relate both to a local difference and to a temporal difference. A temporal difference may result since the sensor device moves and new objects are therefore cyclically captured by the sensor device. A local difference may result from geographical changes, for example structural changes, changed signposting and/or the installation of moving roadworks. However, a local difference may also result from a measurement inaccuracy of a sensor device.

The transmission device is set up to transmit the determined difference between the acquired sensor data and the corresponding reference data to the external management apparatus. The difference may also be organized, for example, in the structure of an array, a graph and/or a list. Consideration of the local and/or temporal changes may substantially update the reference data in the management apparatus.

Another aspect of the present invention describes a vehicle having the communication apparatus according to the invention. The vehicle may ensure that the sensor device moves.

Another aspect of the invention describes a management apparatus, for example a backend or a roadside unit. The management apparatus has a map device and a transmitting and receiving device, the map device being set up to manage map data. These map data may generally be referred to as reference data. The reference data are organized in a grid-based manner.

The transmitting and receiving device is set up to transmit the map data as reference data to a communication apparatus for a vehicle. The transmitting and receiving device is also set up to process a determined difference between sensor data which have been acquired by the vehicle and the corresponding reference data. The transmitting and receiving device is also set up to transmit a level or quantization characteristic curve of differences to be transmitted and/or a coding method to the communication apparatus for predefinition. In other words, the transmitting and receiving device may be set up to influence the communication apparatus, in particular by predefining a threshold value for a difference value above which a determined difference value should be transmitted, and/or the transmitting and receiving device may be set up to predefine the coding method which is used by the communication apparatus for transmission. For pre-definition, currently prevailing data traffic can be taken into account. The threshold value can be predefined, for example, as a quantization characteristic curve, with the result that only difference values above the quantization characteristic curve are transmitted, for example. Alternatively, only values which are below the predefinable threshold value and/or below the quantization characteristic curve can also be transmitted. The quantization characteristic curve may predefine a level of differences, in particular difference values, which are intended to be transmitted.

Yet another aspect of the present invention describes a method for communicating sensor data. The method provides for a sensor or a sensor device for acquiring the sensor data to be moved. The movement of the sensor may produce changes in the sensor data which result in temporal and/or local differences. In other words, the movement of a sensor device may be used to scan an environment of a vehicle. The movement may also result in a field of view of the sensor device being entered and left.

The method also provides for reference data to be obtained or received from an external management apparatus. The management apparatus is arranged outside the sensor or the sensor device, with the result that the reference data are provided via an external interface. In one example, this interface may be a wireless interface. The method also comprises the acquisition of the sensor data, the sensor data being able to be acquired independently of the reception of the reference data.

In order to determine a difference between the acquired sensor data and the corresponding reference data, a deviation between the acquired sensor data and the corresponding reference data may be determined. When determining the difference or the deviation, data which temporally and/or locally correspond may be compared. For the temporal correspondence of the data, a time stamp or a time of the determined data may be captured. The local correspondence may be established using a statement of coordinates, for example a statement of a position in a grid, in a coordinate system and/or in an occupancy grid. In this consideration, a synchronous time base and/or a synchronized reference coordinate system in the communication apparatus and in the management apparatus may be assumed. Furthermore, when comparing the sensor data and the reference data, a state may be taken into account in which the sensor data no longer substantially change over a predefinable period, for example if the sensor data leave the field of view of a sensor device.

If the term "data" is used in the plural form in this text, it may also include an individual data item. The data may be occupancy probabilities and/or objects. An object may have been determined from probabilities. An object may be, for example, a traffic sign, a sign, another vehicle, an infrastructure element or a local anomaly, for example roadworks.

After determining the difference, the method provides for the determined difference between the acquired sensor data and the corresponding reference data to be transmitted to the external management apparatus. In other words, only the differences between the current sensor data and the reference data are substantially transmitted.

Another aspect of the present invention describes a program element which, when executed on a processor, instructs the processor to carry out one of the methods according to the invention for communicating sensor data and/or for managing reference data.

Yet another aspect of the present invention describes a computer-readable medium which stores a program element which, when executed on a processor, instructs the processor to carry out one of the methods according to the invention for communicating sensor data and/or for managing reference data.

A computer-readable storage medium may be a floppy disk, a hard disk, a USB (universal serial bus) storage medium, a RAM (random access memory), a ROM (read only memory) or an EPROM (erasable programmable read only memory). A communication network, such as the Internet, which may make it possible to install or download program code can also be considered to be a computer-readable storage medium.

Furthermore, one aspect of the present invention may describe a method for managing reference data. The method may provide for map data to be transmitted as reference data to a communication apparatus for a vehicle. The method may also provide for a determined difference between currently acquired sensor data and the corresponding reference data to be processed. For control purposes, the method may also predefine a level of differences which is intended to be transmitted and/or a coding method which is intended to be used to transmit the difference data.

One aspect of the invention may be considered to be the fact that sensor data from a sensor device moving in a vehicle are acquired. More up-to-date environmental data than the comparable reference data may therefore be collected. When acquiring the sensor data, it may be taken into account that the sensor data may change from one acquisition cycle to another acquisition cycle on account of the movement of the vehicle. The associated sensor data may only change insignificantly only at a time at which an object is close to the sensor. This time may correspond to a time at which the items which produce the sensor data leave the field of view of the sensor. A traffic sign may thus cyclically produce sensor data of a different distance from the sensor device when it approaches the sensor. The traffic sign may be visible in a first cycle and may consequently generate sensor data. In another cycle in turn, that is to say at a different time for example, the traffic sign may substantially produce no sensor data. The object or traffic sign may produce stable sensor data only when the object or traffic sign is close to the sensor device, which sensor data make it possible to identify the traffic sign with a high degree of probability.

The determination of what object is involved in the determined sensor data relating to an item may be carried out in a cycle in which the associated sensor data leave and/or have already left the predefinable field of view of the sensor device. Temporally preceding sensor data which belong to this item may not be taken into account and can be filtered out or rejected in order to reduce the volume of data generated. For example, objects may not be entered in the environmental model as long as they are in the field of view of a sensor. In one example, the environmental model may also cover a limited range, environment or perimeter around a vehicle or around a sensor device, with the result that data which go beyond this range can be ignored. In particular, a reduction in the data or compression can be achieved and a transmission bandwidth for transmitting the data can be kept low by disregarding or ignoring sensor data which are acquired before the associated item leaves the field of view of the sensor device. The field of view of the sensor device may be used as a window and/or filter for sensor data which need not be stored and/or transmitted if the data relating to an environmental model are transmitted to a management apparatus.

According to one exemplary embodiment of the invention, the acquired sensor data are managed in a vehicle environmental model or environmental model. The vehicle environmental model may be organized in a grid-based, time-based and/or coordinate-based manner, as a result of which sensor data which are stored in the environmental model may be based on a reference coordinate system in order to be able to compare them with reference data.

According to another exemplary embodiment of the invention, a field of view of the sensor device is defined, the acquired sensor data which leave the field of view during the movement of the sensor device being used to determine the difference between the acquired sensor data and the corresponding reference data.

By transmitting only those data which leave the field of view, it may be possible to reduce the number of data items to be transmitted. Consequently, not all data acquired by the sensor device in the field of view need to be stored and/or transmitted. In addition, in one example, the environmental model may substantially include sensor data which are in the predefinable environment of a sensor device.

According to another exemplary embodiment of the invention, the field of view of the sensor device is determined by a cycle length of sampled sensor data, a geometrical capture area, the change in the vehicle position, the change in the vehicle orientation and/or a probability of the sensor data changing.

In particular, the change in the vehicle position and/or the change in the vehicle orientation may produce a movement which may result in an item leaving the field of view.

Since substantially data which do not change are intended to be taken into account in the transmission, a cycle length, a geometrical distance range and/or a change probability or change frequency can be used as a criterion for defining the field of view. Data which no longer change since they have already left a field of view and have already been transmitted also do not need to be transmitted again. Consequently, the number of data items in an environmental model can be reduced further by substantially taking into account only data which no longer change.

Since sensor data are provided by the sensor device or by a multiplicity of sensor devices at regular intervals of time, in cycles or at regular scanning times, a certain amount of time elapses between the time at which an object or an item is captured for the first time by the sensor device and the time at which the object or the item is so close to the sensor device that it can be identified with a high degree of probability. With this assumption, it can be assumed that an item close to the sensor device is correctly identified with a higher degree of probability than an item which is far away from the sensor device. If the item leaves the field of view of the sensor, no new information is provided and the state identified up to this time at which the item leaves the field of view can be transmitted. This state is represented in the environmental model. The change probability of the environmental model is lowest after an item has left the field of view of a sensor or a sensor device. Image processing and/or pattern recognition methods may be used to identify an object from sensor data and from the assignment to an item which actually exists.

It may be determined whether an item which enters the field of view is of interest, in principle, for transmission to the management apparatus. In this case, it may also be identified, for example, that an item which newly enters the field of view of the sensor device is another road user not of interest to the management apparatus and the map managed by the latter. Therefore, no transmission at all needs to be provided for this item. However, the item may nevertheless be tracked by the sensor device since it is possibly of interest to the internal environmental model of the vehicle.

In contrast, a structural item or an infrastructure object, for example a traffic sign, may be of interest to the management apparatus, in particular if it has changed in comparison with the reference data. This item may be tracked from the first appearance to reliable identification and may be entered in the environmental model and/or transmitted to the management apparatus at the time at which the identification probability is highest. This probability may be highest when the item leaves the field of view of the sensor device. The field of view may be defined by a number of scanning cycles, a geometrical function or an illumination cone of the sensor device and/or by considering the change frequency, for example as a result of incorrect identification.

In a predefinable filter, it is possible to stipulate which objects or items are of interest to the management apparatus, with the result that only these objects or items and/or only environmental models which contain them are transmitted. If no infrastructure objects occur for a long time, the environmental model does not need to be transmitted. Preprocessing of the sensor data makes it possible to avoid unnecessary transmission of objects which are not of interest and/or transmission of environmental models containing items which have not yet been reliably identified. The volume of data transmitted can be reduced by means of such a selection or filtering.

It is additionally possible to determine whether an identified object is already present in the reference data in order to avoid transmission again. If a traffic sign is identified and is already present at the corresponding local position in the reference data, there is no need to update the reference data in the management apparatus. However, if it is determined, for example, that the location of the traffic sign or generally of the identified object has shifted and/or the object has never been previously identified, this is an interesting item of information which is intended to be transmitted to the management apparatus. In this case, tolerances can also be taken into account in order to compensate for inaccuracies of the sensor devices.

According to another exemplary embodiment of the invention, the sensor device may be at least one sensor device selected from the group of sensor devices consisting of a camera, a distance sensor, a radar sensor, an ADAS (advanced driver assistance system) sensor, an ultrasonic sensor, a LIDAR (light detection and ranging) sensor, and a LaDAR (laser detection and ranging) sensor.

According to another exemplary embodiment of the invention, the sensor device, the receiving device, the processing device and/or the transmission device can be connected to one another using a CAN (controller area network) bus, via Flexray and/or Ethernet (IEEE 802.x).

A CAN bus is a standard transmission bus system of a vehicle from the family of field buses. If the corresponding components provide CAN interfaces, they can be easily connected to one another by being connected to the bus. A similar situation may apply to Flexray or Ethernet.

According to another exemplary embodiment of the invention, the receiving device and/or the transmission device may have an interface selected from the group of interfaces consisting of a radio interface, a car-to-X interface, a WiFi interface, a UMTS (universal mobile telecommunications system) interface, a GSM (global system for mobile Communications) interface, a GPRS (general packet radio service) interface, and/or an LTE (long term evolution) interface.

A radio interface enables wireless communication between the management apparatus and the communication apparatus. Further examples of wireless connections are Bluetooth, WLAN (for example WLAN 802.11a/b/g/n or WLAN 802.11p), ZigBee or WiMax.

According to another exemplary embodiment of the invention, the transmission device has a quantization device, the quantization device being set up to transmit the determined difference above a predefinable level and/or a predefinable change rate. In one example, the quantization device may be set up to transmit the determined difference, the value of which is above a predefinable quantization step height and/or above a predefinable quantization step profile. A quantization step profile may be relevant in the case of non-equidistant quantization.

A quantization device results in a reduction in the volume of data or compression by virtue of an input signal being mapped to an output signal having a reduced number of steps in comparison with the input signal or being digitized. In this case, the width of the steps may be equidistant or variable, for example. If the value of a difference falls below such a step, it may not be identified and therefore may not be taken into account.

Alternatively or in combination with the quantization device, the transmission device may have a coding device, the coding device being set up to code the determined difference using a predefinable coding method.

The level of the differences which are intended to be transmitted can be predefined by the external management apparatus. In one example, the management apparatus may predefine a quantization characteristic curve. The level of the change rates at which transmission is intended to take place may likewise be predefined by the management apparatus.

The external management apparatus may also influence the coding method to be used.

As a result of the different ways of influencing the communication apparatus, the management apparatus can control the data stream which is made available to it by a communication apparatus and/or by a multiplicity of communication apparatuses. In this manner, the management apparatus can provide the communication apparatus with feedback. The feedback may take into account a current volume of data, for example.

According to another exemplary embodiment of the invention, the predefinable level, the quantization step height, the quantization step profile, a quantization characteristic curve and/or the predefinable coding method can be predefined by the external management apparatus. For this influence, a communication channel can be set up between the communication apparatus and the management apparatus.

According to another exemplary embodiment of the invention, the transmission device has at least two buffers which can be changed over.

Providing at least two buffers makes it possible to store and code environmental data, that is to say data relating to the environmental model, in a parallel manner. The buffers can be in the form of memory devices which operate according to the FIFO (first in first out) principle.

The reference data which are managed by the management apparatus may be map data or geographical data, in particular digital map data relating to a digital topographic map.

The term "digital map" or "digital map data" can also be understood as meaning maps for advanced driver assistance systems (ADAS) without navigation taking place.

The vehicle is, for example, a motor vehicle, such as an automobile, a bus or a truck, or else a rail vehicle, a ship, an aircraft, such as a helicopter or airplane, or a bicycle, for example.

Navigation systems which determine navigation data or localization data, for example satellite data or GPS data, can be used to determine the location of the sensor data. It is pointed out that, in the context of the present invention, GPS is representative of all global navigation satellite systems (GNSS), for example GPS, Galileo, GLONASS (Russia), Compass (China), IRNSS (India).

At this point, it is pointed out that the position of the vehicle can also be determined using cell positioning. This is appropriate, in particular, when using GSM or UMTS networks.

Car-to-car communication (C2C communication) is a term defined by the car-to-car communication consortium (C2C-CC), an association of a plurality of automobile manufacturers. C2C-CC is developing an open industrial standard for vehicle-to-vehicle communication and for communication between the vehicles and infrastructure devices or infrastructure objects (traffic lights, etc.). An infrastructure device is an object or item in the sense of this text.

The basis for such car-to-car radio systems may be wireless communication systems in the form of WLANs (wireless local area networks) according to the standard defined by the IEEE under the standard designation 802.11, for example.

C2X communication comprises C2C communication (vehicle-to-vehicle communication) and communication between a vehicle and a further device which is not a vehicle, for example an infrastructure device (traffic lights, traffic signs etc.).

Further exemplary embodiments of the present invention are described below with reference to the figures.

BRIEF DESCRIPTION OF THE DRAWINGS

The illustrations in the figures are schematic and are not true to scale. In the following description of FIG. 1 to FIG. 6, the same reference symbols are used for the same or corresponding elements.

DETAILED DESCRIPTION

Figure 1:
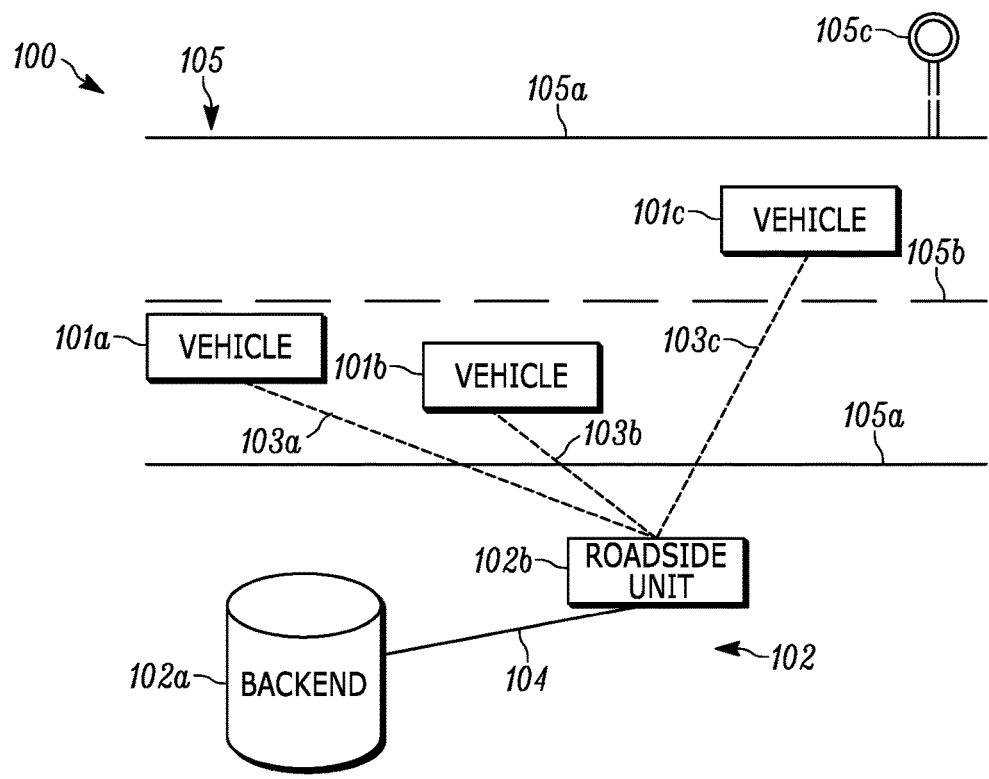
FIG. 1 shows a communication system for communicating data from a vehicle environmental model to a management apparatus according to one exemplary embodiment of the present invention.

The communication system 100 illustrated in FIG. 1 has a multiplicity of vehicles 101a, 101b, 101c having communication apparatuses (not illustrated). The vehicles communicate with a management apparatus 102 via the wireless connections 103a, 103b, 103c or radio connections 103a, 103b, 103c. The management apparatus 102 has the backend 102a and a roadside unit 102b. The roadside unit may be integrated in a base station 102b. A backend 102a is often also used alone as the management apparatus 102. Instead of using the cable connection 104 between the backend 102a and the roadside unit 102b, the vehicles 101a, 101b, 101c, in particular their communication apparatuses, communicate directly with the backend 102a.

The system 100 illustrated in FIG. 1 may be used to implement a data compression method for efficiently transmitting data from the vehicle environmental model of the vehicles to the backend 102a.

Each of the multiplicity of vehicles 101a, 101b, 101c has its own vehicle environmental model. Each of the vehicles 101a, 101b, 101c may have a database in order to store the vehicle environmental model. The vehicles are moving, for example, on a road 105 with infrastructure objects. The infrastructure objects 105a, 105b, 105c may be a crash barrier 105a, a road marking 105b and/or a traffic sign 105c.

In the case of uncompressed transmission of the data from the vehicle environmental model, very large volumes of data may be produced and may result in an obstacle when implementing this function of interchanging information. Compression makes it possible to reduce the volume of data.

A plurality of subscribers are involved in the communication with the backend 102a. One or more vehicles 101a, 101b, 101c communicate with a base station 102b via a radio connection 103a, 103b, 103c. This base station 102b may be a GSM base station 102b or a roadside unit 102b, as is used for C2X communication. Data compression should be aimed for for both connections 103a, 103b, 103c, 104.

Figure 2:
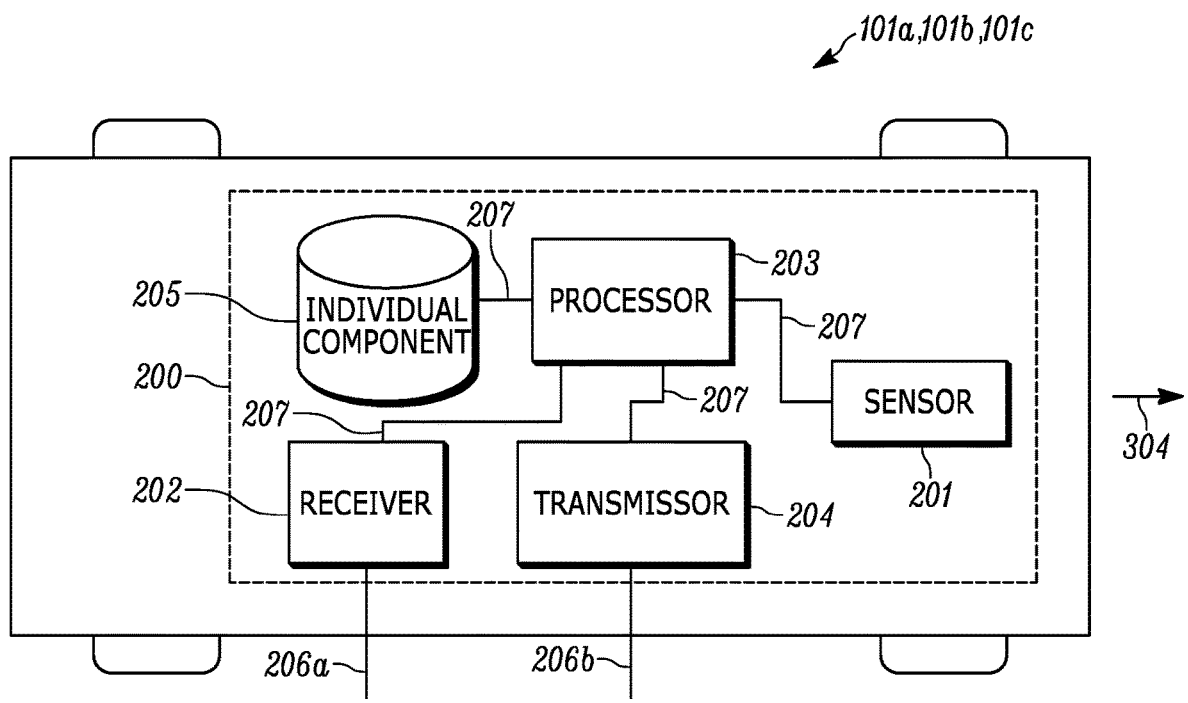
FIG. 2 shows a vehicle with a block diagram of a communication apparatus according to one exemplary embodiment of the present invention.

A vehicle 101a, 101b, 101c which communicates with the backend is illustrated in FIG. 2. It has a communication apparatus 200. The communication apparatus 200 has a sensor device 201, the receiving device 202, the processing device 203 or the processor 203, the transmission device 204 and the database 205. The receiving device 202 and the transmission device 204 may be integrated in a single transmitting/receiving device and are used for wireless communication via the antennas 206a, 206b. The individual components 201, 202, 203, 204, 205 are connected via a vehicle bus, for example via the CAN bus 207.

The environmental model of the vehicle is stored in the database 205. Since the vehicle 101a, 101b, 101c is movable, the communication apparatus 200 can be moved. As a result of the movement, the relative positions of the items 105, 105a, 105b, 105c with respect to the vehicles may change, and sensor data can be cyclically acquired using the sensor device 201 and can be stored in the environmental model in the database 205. The acquired sensor data can be stored with indications of the time and/or location. Irrespective of the acquisition time or cycle, the absolute indications of the location have substantially constant values if static objects are assumed. The relative indications of the location with respect to the vehicle may change, however. The position of the vehicle inside an environmental model may also change. In the case of moving objects, such as other vehicles, the indications of the location also change over time.

Figure 3:
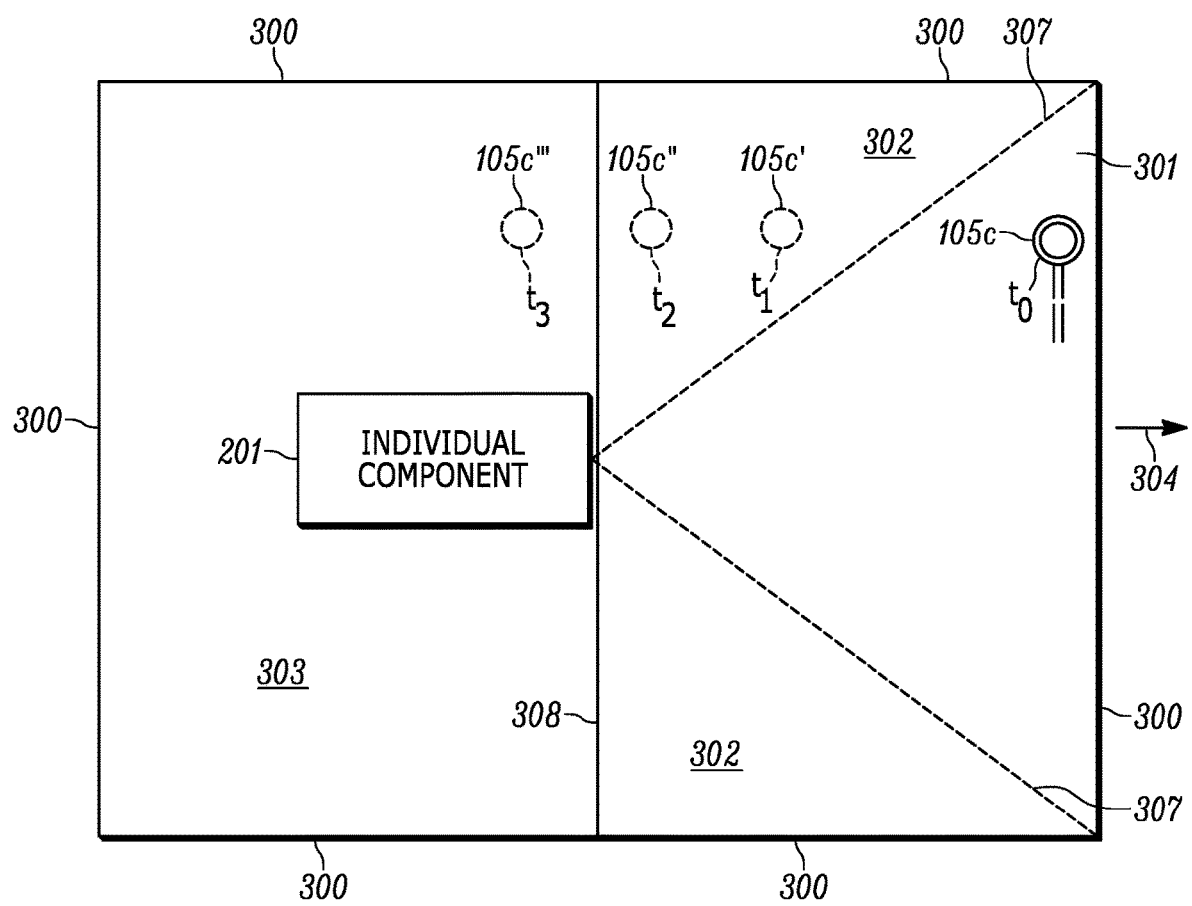
FIG. 3 shows a sensor device having a field of view according to one exemplary embodiment of the present invention.

FIG. 3 illustrates a sensor device 201 having a sensor field of view 301 or a sensor field of vision 301. The field of view is an excerpt from the environmental model 300 which concomitantly moves with the sensor device 201. The sensor device 201 or the vehicle sensor system 201 looks far ahead in the direction of movement 304 of the vehicle in order to make it possible for the vehicle 101a, 101b, 101c (not shown in FIG. 3) to react to the environment. That is to say, the sensor device 201 can capture items 105c which are already far away. The field of view 301 is that area of an environmental model 300 which is captured by the sensor device 201, which environmental model is illustrated as a square in FIG. 3. The environmental model 300 has a transition area 302 which is outside the field of view 301 and is in front of the sensor device 201 in the direction of movement 304 of the sensor device 201. The transition area 302 has a shape corresponding to two opposite symmetrical triangles. The boundary 307 is between the transition area 302 and the field of view 301. If a stationary object 105c crosses the boundary 307 during a movement of the sensor device 201, it leaves the capture area 301 of the sensor device 201. After the object 105c has left the field of view 301 of the sensor device 201, it no longer changes the environmental model. Objects which are behind the sensor device 201 in the direction of movement 304 likewise no longer change the environmental model. Objects behind the sensor device 201 are in the area 303 behind the sensor boundary 308. These objects in the area 303 are objects which have already been transmitted once and therefore do not have to be transmitted again since they do not provide any more recent information.

The capture area 301 or field of view 301 is illustrated in the form of a triangle in FIG. 3. However, it may also be parabolic, rectangular or trapezoidal and, in a simplified manner, can be approximated by a triangle, a parabola or a trapezoid or a rectangle. A rectangular approximation is appropriate, for example, when a plurality of sensors having differing fields of view are used, in particular.

Depending on the number of observations cycles or scanning cycles, the upcoming information in the field of view 301 also changes greatly since, with a small number of observation cycles, for example incorrect detection, objects 105c which have not been identified and inaccuracies in the captured positions are still present.

In order to reduce the volume of data, provision may be made for the transmission device 204 not to transmit the complete environmental model 300 in each cycle, but rather to transmit only that restricted area 302 outside the field of view 301 of the sensor device 201 in which the data relating to the environmental model have just left the sensor field of view. The data have reached the maximum reliability in this area and changes substantially no longer occur in future cycles.

The area 303 behind the sensor device 201 in the direction of movement 304 can likewise be omitted from the transmission since the data are substantially no longer subject to any changes and have already been transmitted in preceding cycles. A sensor update does not take place in the area 303 since this area is no longer captured by the sensors 201. This area can likewise be modeled as a triangle, a parabola, a trapezoid or a rectangle. During each measurement cycle, the data are updated in the area 301, as a result of which the environmental model data change greatly.

In particular, the areas 301 which were observed only with a few cycles, that is to say with a low scanning rate, and in which the values still change greatly are omitted from storage and/or transmission. This is because provision may be made for a multiplicity of sensor devices 201 to be provided. For example, a sensor device looking far in front of the sensor device 201 can operate with a high cycle duration, that is to say with a low scanning rate, whereas a sensor device looking close in front of the sensor device 201 can operate with a low cycle duration, that is to say with a high scanning rate. The data in this area 301 change very greatly and have not yet reached their maximum reliability and are therefore suitable or necessary only to a restricted extent for updating the backend data or reference data. The aim is therefore to transmit substantially only the data with the highest identification probability or with the lowest change probability.

The data rate for transmitting the data relating to the environmental model 300 can be reduced if substantially only the information or data relating to the areas 302 which have just left the sensor field of view and consequently cross or have crossed the boundary 307 substantially at the time of provision are transmitted. After being transmitted once, these data need not be transmitted again since the information is already available to the backend and further transmission can be dispensed with. The information further back in time was transmitted in preceding cycles and therefore no longer changes. This information further back in time is data which have been acquired in a preceding cycle. These data are substantially in the area 303 if a movement of the sensor device in the direction of movement 304 is taken as a basis.

On account of the movement, the sensor device 201 and on account of the cyclical sampling of the sensor data and therefore on account of the cyclical capture of the objects 105c, the position of the object relative to the vehicle in the data relating to the cyclically updated environmental model 300 changes on the basis of time. In this case, a representation of the static vehicle environment in global coordinates is often used, the position of the object in the environmental model remaining constant, but the position of the vehicle in the environmental model changing from cycle to cycle.

The vehicle moves or "drives" through the environmental model.

In one example, the vehicle environment is represented in fixed global coordinates, the area 300 resulting from the fact that only a limited area around the vehicle is represented. The area 300 can then be interpreted as a window. The "front" boundary of the area 300 in the direction of travel 304 results from the limited visual range of the environmental model, for example as a result of the limited sensor range or as a result of the decreasing sensor accuracy. The rear boundary results from the fact that excessively "old" data are deleted. The environmental model 300 can be understood as meaning a topographic map, of which only the limited area 300 is held in the memory of the vehicle or the communication apparatus. The position of moving objects changes with fixed global modeling.

The coordinates of the boundaries 307, 308 between the areas 301, 302 and 303 inside the environmental model 300 depend on the vehicle position and the orientation of the vehicle when considering the cyclically updated environmental model 301 and, in the case of a moving vehicle, change from cycle to cycle on the basis of the vehicle movement.

Alternatively, vehicle-based coordinates or sensor-based coordinates can be used, the coordinates of the boundaries 307, 308 between the areas 301, 302 and 303 remaining fixed, but the position of static objects in vehicle coordinates changing in each cycle in the case of a moving vehicle.

A time/location transformation therefore takes place. The object 105c, for example, therefore "wanders" relative to the vehicle at the different scanning times t0, t1, t2, t3 from the field of view 301 across the boundary 307 into the transition area 302 and finally into the rear area 300. The wandering of the static object 105c becomes visible in the sensor-based coordinate system, whereas the object 105c appears at a fixed location based on a coordinate system of the environmental model 300. The temporally changed image of the object 105c is represented as the object 105c at the time t0, as the object 105c' at the time t1, as the object 105c'' at the time t2 and as the object 105c''' at the time t3. However, the transmission takes place only at the time t1 since the identification accuracy is still too low at the time t0. From the time t2 on, no further transmission must be carried out since the sensor is no longer able to capture changes in the object 105c. The time increases from the time t0 to the time t3. An entire environmental model 300 is generated at each time. However, the changing areas are filtered out and only the changes are transmitted as the difference.

The difference is formed in the processing device 203.

Figure 4:
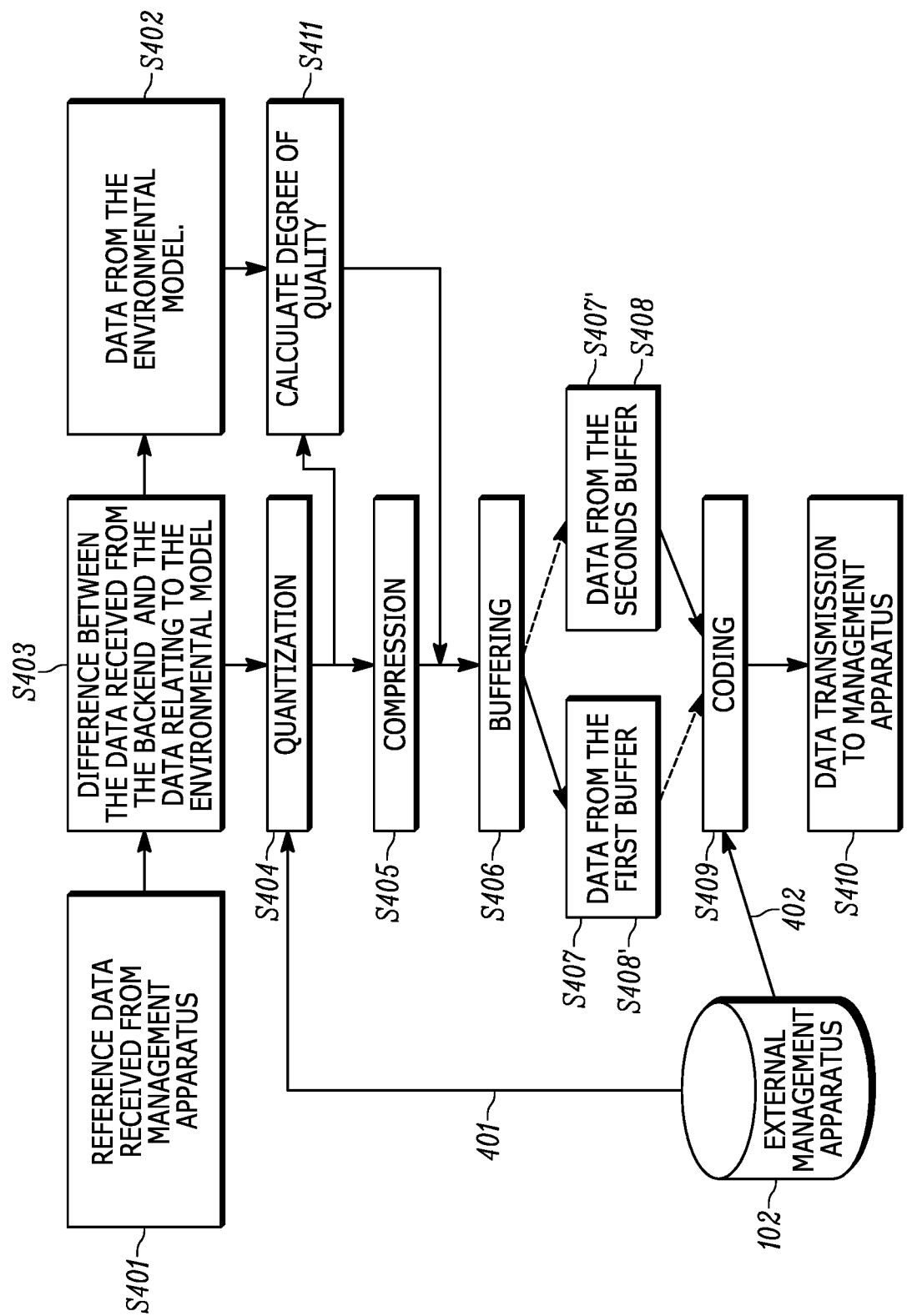
FIG. 4 shows a flowchart for a method for communicating sensor data according to one exemplary embodiment of the present invention.

FIG. 4 shows details of the sequence of the compression method in the vehicle. In this case, a method for communicating sensor data is illustrated in the form of a flowchart. Whereas the method represents the transmission of data to an external management apparatus 102a, the method can also be used for the transmission of occupancy grids inside the vehicle or for the transmission of an environmental model inside the vehicle.

However, since the transmission of data from the vehicle to the backend 102a is not critical to safety and is less time-critical than a method for internal vehicle communication, the transmission method can be optimized with respect to the data compression by using buffering, for example by filtering and analyzing the sensor data. External communication can also take place with a lower priority than internal communication. The environmental model 300 may be organized as a grid model 300 in the database 205. Objects which cannot be driven over can likewise appear as so-called occupancy grids on the basis of a grid model. In addition to the occupancy grids, the other objects, features or items of the static environment can also be transmitted, for example lane markings 105b or traffic signs 105c. The moving environment, for example other vehicles, can also be captured. However, on account of the time change, the transmission of the moving objects may only be of secondary interest. Filtering may therefore also provide for static and movable object data to be identified in order to substantially transmit only the static objects.

Whereas the object type is not determined for occupancy grids, the transmission of items or objects presupposes that the objects were identified before they were stored in the environmental model.

Since the reference data stored in the backend are static, it can be assumed that only a small part of the data changes. The reference data are received from the external management apparatus 102 in step S401. The cycle time with which reference data are received can be a multiple greater than the cycle time with which the sensor device is operated. Different sensor devices 201 may operate with different cycle times. The received reference data may be stored, for example, in a separate area of the database 205. In one exemplary embodiment, the reference data match the data in the environmental model 300 and are therefore rigid, and only the boundaries 300, 307, 308 move across a static environmental model 300. In this example, the boundaries of the captured area move with the vehicle and/or with the communication apparatus and move across the environmental model. In this example, the environmental model may be decoupled from the area 300. The area 300 may then be interpreted as a window which moves. Calculations are always carried out with fixed global coordinates in the backend.

In another example, it is possible to work with fixed vehicle coordinates inside the vehicle or inside the communication apparatus, that is to say with coordinates which are based on the vehicle. In this case, inside the vehicle on the basis of the vehicle position, the vehicle environmental model can be transformed into global coordinates or the reference data can be transformed into vehicle coordinates in order to form the difference.

The reference data are substantially provided only with a location mark in order to be able to establish a benchmark for the sensor data relating to the environmental model. The corresponding data are read from the environmental model in step S402.

In step S403, a difference between the data received from the backend and the data relating to the vehicle environmental model is formed. This is substantially a comparison of the static infrastructure data which do not move within a predefinable short interval of time.

When providing the data relating to the environmental model, in particular when reading the data relating to the environmental model from the database 205, that area 302 of the environmental model 300 which is currently moving from the field of view of the sensor system 201 may be used.

In the event of slight changes, the formation of the difference may result in no or only small differences occurring for many values and large deviations may be rare. This may mean that, when the grid-based environmental model is compared with the corresponding locations of the reference data, only slight changes in the environmental model in comparison with the reference data are determined since the captured objects are usually infrastructure data which are organized in a substantially static manner.

In step S404, quantization can be used to control which differences are transmitted. In particular, in step 404, the level of the differences to be transmitted can be stipulated. In other words, a threshold value can be stipulated, in which case difference values which are below the threshold value are not transmitted. A slight difference may occur, for example, if a traffic sign is only identified as being offset by a few centimeters with respect to the reference data and is therefore still within a tolerance range. The management apparatus 102 can influence the quantization, that is to say the level of the differences to be transmitted, and can control the flow of data by means of feedback of this type. In the case of a high volume of data, transmission of different differences can therefore be prevented.

In step S405, a precoding method combines areas having identical values after the quantization in order to thus achieve compression by combining the data.

In step S406, buffering takes place. This buffering may be asynchronous. Since both the data rate of the environmental data and the available bandwidth of the radio interface 103*a*, 103*b*, 103*c*, 205*b* to the management apparatus 102 may fluctuate and the transmission need not have hard real-time capability, buffering of the data can also be used to smooth the data rate. In one example, at least two buffers can be used in connection with the compression. The first buffer of the at least two buffers may be filled with data in step S407, whereas the second of the at least two buffers codes and transmits the data in step S408. Steps S407 and S408 can be carried out in a substantially parallel manner. The role of the buffers can then be swapped, that is to say in the next cycle, with the result that the second, now empty, buffer is filled with data in step S407' and the first buffer can code or compress and transmit the data in step S408'. When filling the buffers, the data to be transmitted are written to the buffer and are therefore stored.

From step S408 or S408', there is a transition to step S409 in which the now available data from the buffer are coded or encoded. A predefinable coding method can be used as the coding method in step S409. The coding method can be predefined by the external management apparatus 102. An entropy coding method, for example the Huffman code, or arithmetic coding may be possible as the coding method. In these coding methods, the distribution of the symbols contained in the buffer is calculated and short codes, that is to say few bits, are allocated for frequently occurring symbols. On account of the formation of the difference, an uneven distribution of values can be expected. The imbalance may result in slight deviations of the environmental data, that is to say the currently determined data relating to the environmental model, occurring more often than large deviations with respect to the reference data. In contrast to pure occupancy grid compression, the use of phrase coding methods, for example LZW (Lempel-Ziv-Welch), or block sorting methods, for example by means of Burrows-Wheeler transformation, is also suitable since the data may contain, for example, the information relating to a plurality of items, infrastructure objects or traffic signs which can be compressed well by means of re-sorting or block sorting, for example.

In step S410, the data are transmitted to the management apparatus 102.

For communication between the external management apparatus and the communication apparatus in steps S404 and S409, a feedback channel 401, 402 may be provided. The management apparatus 102, the backend 102*a* or, in particular, the base station 102*b* can influence the data compression in at least two ways. On the one hand, in the case of many subscribers 101*a*, 101*b*, 101*c* and/or in the case of major changes, for example moving roadworks, the result may be large data traffic on the radio path 103*a*, 103*b*, 103*c*. Adapting the compression method at the different points of the compression method, for example by adapting the quantization in step S404 via the feedback channel 401, may require increased compression from the vehicles and may thus reduce the total volume of data to an acceptable level. Furthermore, the management apparatus 102, the base station 102 or the backend 102 may predefine parameters for the compression in step S409 via the feedback channel 402, for example parameters in the form of the tables used for the entropy coding.

If the quantization which results in lossy compression is used, a degree of quality can be calculated in a step S411 from the quantized data obtained in step S404 and the data relating to the vehicle environmental model which are provided in step S402. This degree of quality indicates the extent to which the quality of the data is actually influenced by lossy compression. This information is additionally transferred to the buffers in step S406 and is transmitted to the management apparatus 102 or to the backend server 102 so that this management apparatus 102 can react accordingly to the reduced quality. Since the volume of data for the degree of quality is a very low value in comparison with the volume of data for the environmental data, for example 1 byte per buffer, the degree of quality can be transmitted together with the differences to the management apparatus.

Compression can be additionally used during communication between base stations 102b and the backend 102a. In this case, it can be assumed that the data transmitted from the vehicles 101a, 101b, 101c to the base station 102b strongly correlate since, as can be seen in FIG. 1, the vehicles 101a, 101b, 101c which move in the same direction of travel perceive identical or overlapping items. For example, all vehicles 101a, 101b, 101c, in particular their sensor devices, perceive the same infrastructure objects, such as the same moving roadworks. For compression, the environmental data from all vehicles 101a, 101b, 101c are assigned to the base station 102b in the radio cell on the basis of the position, for which purpose an additional, third buffer can be used in the base station, for example. Before the data are transmitted from the base station 102a to the backend 102a, the mean difference and the deviation of the individual vehicles from the mean difference are determined. Since an unequal distribution of the differences can be assumed, they can be compressed further by applying an entropy coding method to the buffer in the base station or in the management apparatus.

Based on an occupancy grid of the environmental model, the differences between cells of the occupancy grid and the cells of the occupancy grid contained in the reference data are formed. If infrastructure data or objects in the environmental model, for example a traffic sign, are considered, the difference can be calculated, for example, from a deviation of the measured position of an object between the map in the backend 102a and the sensor measurement. In this case, both the objects of the environmental model and the reference data can be stated in global coordinates, for example in the UTM (Universal Transverse Mercator) system or in the WGS84 system. Forming the difference, instead of the complete global position for which a large number of digits is needed to indicate a position with an accuracy in the cm range on account of the large absolute numerical values, makes it possible to transmit only an accurate position difference in which the large absolute value is eliminated and only the small difference is required, which has a high degree of accuracy and an accordingly reduced number of digits.

When representing the environmental model in vehicle coordinates, the indications of the positions of the objects contained in the environmental model can be transformed into global coordinates with the aid of the global position of the vehicle and can therefore be compared with the reference data, as a result of which the above method for forming the difference between positions can also be used again.

Since all attributes in a map are geo-referenced, that is to say are provided with global coordinates, this formation of the difference can be applied to all attributes in the map. Further attributes for which a difference can be formed between the environmental model value and the value from the map are, for example, the curvature or change in curvature of lane courses or lane markings, the width of lanes or the reliability of the attributes as a probability value. The formation of a difference can also be used, for example, for data compression for all further attributes of a map, for example for a sign ID which indicates the significance of the traffic sign for which a position deviation has been determined. If a position deviation results for a multiplicity of different signs, but the sign ID remains the same, an accumulation of the difference "0" instead of the differing sign IDs results in the data to be transmitted, as a result of which good compression can be achieved using an entropy coding method. A slight deviation in the position of map elements can always be expected on account of the sensor errors, for example as a result of noise.

The described method makes it possible to achieve compression. Slight deviations occur more often and benefit from the entropy coding. The quantization makes it possible to entirely prevent the transmission of position deviations below a threshold.

The situation is similar in the case of lane markings, for example. Here, differences in the position and the curvature parameters are calculated and can be compressed using the method described above.

The transmission method can be used to reduce the bandwidth during communication between a vehicle 101a, 101b, 101c and a management apparatus, for example a base station 102b and/or a backend 102a, in order to reduce the costs for this communication or to allow it in the first place. The method can also be used for communication between a base station 102b and a backend 102a.

In order to increase the compression factor, the compression method is adapted to the properties of the environment capture by means of a sensor device 201, for example by means of ADAS sensors, and to the properties of the communication between a vehicle, a base station and/or a backend in order to achieve efficient compression at a high compression rate. It is therefore possible to achieve higher compression in comparison with communication without compression or the use of a standard compression method. Feedback can also ensure good compression.

Figure 5:
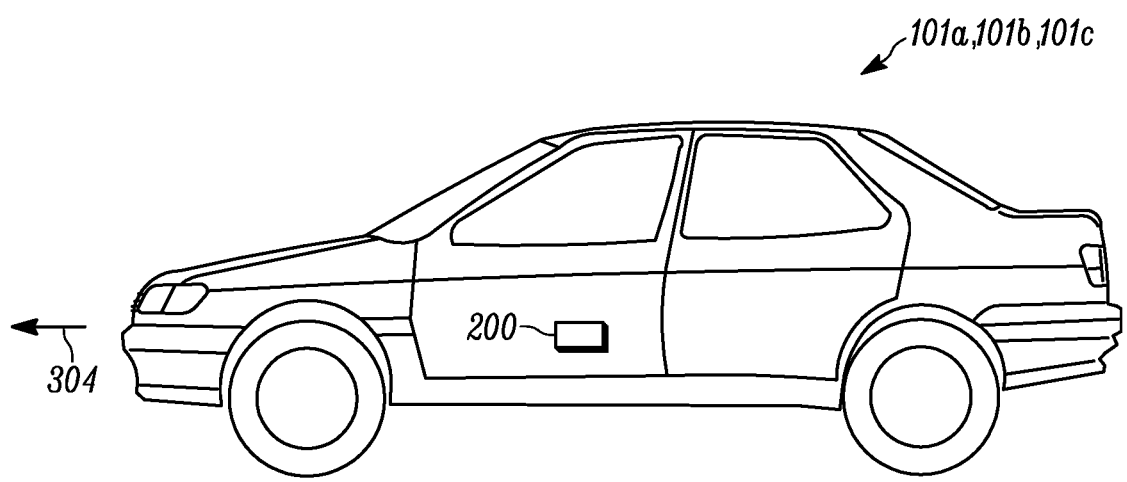
FIG. 5 shows a vehicle having a communication apparatus according to one exemplary embodiment of the present invention.

A vehicle having a communication apparatus is illustrated in FIG. 5.

Figure 6:
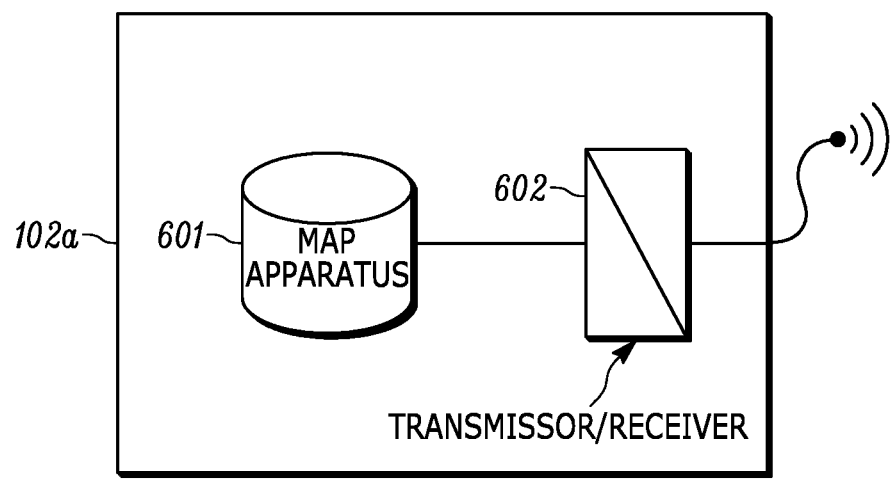
FIG. 6 shows a management apparatus according to one exemplary embodiment of the present invention.

FIG. 6 shows a management apparatus 102a having a map apparatus 601 and a transmitting and receiving device 602. The transmitting and receiving device 602 is set up to transmit map data as reference data to a communication apparatus 200 for a vehicle. The transmitting and receiving device 602 is also set up to process a determined difference between sensor data acquired by the vehicle and the corresponding reference data. The determined difference can be received as a compressed data stream, as emitted by a communication apparatus 200. The transmitting and receiving device 602 is also set up to transmit a minimum level of differences to be transmitted, a quantization method, a quantization characteristic curve and/or a coding method to the communication apparatus 200 for predefinition in order to thus provide the communication apparatus 200 with feedback and to control the transmission bandwidth. During this control, the vehicle density of the number of vehicles transmitting to the management apparatus 102 can be taken into account. Consequently, the management apparatus 102 can predefine the quantization conditions and/or the coding conditions.

The management apparatus can reverse the compression operation illustrated in FIG. 4 and can receive the output data by reversing at least the non-lossy compression steps.

It should be additionally pointed out that "comprising" and "having" do not exclude any other elements or steps and "one" or "a(n)" does not exclude a multiplicity. It is also pointed out that features or steps which have been described with reference to one of the exemplary embodiments above can also be used in combination with other features or steps of other exemplary embodiments described above. Reference symbols in the claims should not be considered to be a restriction.

The invention claimed is:

1. A communication apparatus for a vehicle, having:
a sensor device;
a receiving device;
a processing device;
a transmission device;
the sensor device being set up to acquire sensor data during a movement of the sensor device;
the receiving device being set up to receive reference data from an external management apparatus;
the management apparatus being arranged outside the sensor device;
the processing device being set up to determine a difference between the acquired sensor data and a corresponding reference data;
the transmission device being set up to transmit the determined difference between the acquired sensor data and the corresponding reference data to the external management apparatus, the transmission device having a quantization device, the quantization device being set up, based, at least in part, upon currently prevailing data traffic, to transmit the determined difference above a predefinable quantization step height, a quantization step profile, a predefinable change rate and/or a predefinable quantization characteristic curve, and the transmission device comprising a coding device, the coding device being set up to code the determined difference between the acquired sensor data and the corresponding reference data using a predefinable coding method selected from a group consisting of: an entropy coding method, a phrase coding method, and a block sorting method;
the acquired sensor data being managed in a vehicle environmental model that is organized in at least one of a grid-based, time-based, and coordinate-based manner in order to be able to compare the acquired sensor data, which are stored in the vehicle environmental model, with the corresponding reference data;
wherein, when quantization data output by the quantization device results in lossy compression, a degree of quality is calculated from the quantization data output and from data relating to the vehicle environmental model, wherein the degree of quality indicates an extent to which quality of the quantization data output by the quantization device is actually influenced by lossy compression, and wherein the degree of quality is transmitted to the management apparatus so that the management apparatus can react accordingly to a reduced quality.

2. The communication apparatus as claimed in claim 1, wherein acquired sensor data when a detected object leaves a field of view during the movement of the sensor device being used to determine the difference between the acquired sensor data and the corresponding reference data.

3. The communication apparatus as claimed in claim 2, the field of view of the sensor device being determined by a cycle length of sampled sensor data, a geometrical capture area, a change in vehicle position and vehicle orientation and/or a probability of the sensor data changing.

4. The communication apparatus as claimed in claim 3, the sensor device being at least one sensor device selected from a group of sensor devices consisting of:
a camera;
a radar sensor;
an ADAS sensor;
an ultrasonic sensor;
a light detection and ranging sensor; and
a laser detection and ranging sensor.

5. The communication apparatus as claimed in claim 4, the sensor device, the receiving device, the processing device and/or the transmission device being connected to one another using a CAN bus, via Flexray and/or Ethernet.

6. The communication apparatus as claimed in claim 5, the receiving device and/or the transmission device having an interface selected from a group of interfaces consisting of:
a radio interface;
a car-to-X interface;
a WiFi interface;
a GSM interface;
a UMTS interface, and/or
an LTE interface.

7. The communication apparatus as claimed in claim 6, the predefinable quantization characteristic curve and/or the predefinable coding method being able to be predefined by the external management apparatus.

8. The communication apparatus as claimed in claim 7, the transmission device having at least two buffers which can be changed over.

9. The communication apparatus as claimed in claim 1, the sensor device being at least one sensor device selected from a group of sensor devices consisting of:
a camera;
a radar sensor;
an ADAS sensor;
an ultrasonic sensor;
a light detection and ranging sensor; and
a laser detection and ranging sensor.

10. The communication apparatus as claimed in claim 1, the sensor device, the receiving device, the processing device and/or the transmission device being connected to one another using a CAN bus, via Flexray and/or Ethernet.

11. The communication apparatus as claimed in claim 1, the receiving device and/or the transmission device having an interface selected from a group of interfaces consisting of:
a radio interface;
a car-to-X interface;
a WiFi interface;
a GSM interface;
a UMTS interface, and/or
an LTE interface.

12. The communication apparatus as claimed in claim 1, the predefinable quantization characteristic curve and/or the predefinable coding method being able to be predefined by the external management apparatus.

13. The communication apparatus as claimed in claim 1, the transmission device having at least two buffers which can be changed over.

14. A management apparatus having:
a map device;
a transmitting and receiving device;
the map device being set up to manage map data;
the transmitting and receiving device being set up to transmit map data as reference data to a communication apparatus for a vehicle;
the transmitting and receiving device also being set up to process a determined difference between sensor data acquired by the communication apparatus and a corresponding reference data; and
the transmitting and receiving device also being set up to transmit, based, at least in part, upon currently prevailing data traffic, a quantization characteristic curve of differences to be transmitted and a coding method to the communication apparatus for predefinition, wherein a transmitting and receiving device of the communication apparatus comprises a coding device, the coding device being set up to code the determined difference between the sensor data acquired by the communication apparatus and the corresponding reference data using a predefinable coding method selected from a group consisting of: an entropy coding method, a phrase coding method, and a block sorting method;
the acquired sensor data being managed in a vehicle environmental model that is organized in at least one of a grid-based, time-based, and coordinate-based manner in order to be able to compare the acquired sensor data, which are stored in the vehicle environmental model, with the corresponding reference data;
wherein, when the quantization characteristic curve of differences to be transmitted results in lossy compression, a degree of quality is calculated from the quantization characteristic curve of differences to be transmitted and from data relating to the vehicle environmental model, wherein the degree of quality indicates an extent to which quality of the quantization characteristic curve of differences to be transmitted is actually influenced by lossy compression, and wherein the degree of quality is transmitted to the management apparatus so that the management apparatus can react accordingly to a reduced quality.

* * * * *